C. O. BASTIAN.
MEANS FOR POSITIVELY INDICATING THE CONDITION OF STEEL DURING HEAT TREATMENT.
APPLICATION FILED MAY 10, 1920.

1,346,693. Patented July 13, 1920.

Inventor
C. O. Bastian
by Wilkinson & Giusta
Attorneys.

UNITED STATES PATENT OFFICE.

CHARLES ORME BASTIAN, OF LONDON, ENGLAND.

MEANS FOR POSITIVELY INDICATING THE CONDITION OF STEEL DURING HEAT TREATMENT.

1,346,693.　　　　　Specification of Letters Patent.　　Patented July 13, 1920.

Application filed May 10, 1920. Serial No. 380,382.

*To all whom it may concern:*

Be it known that I, CHARLES ORME BASTIAN, electrical engineer, a subject of the King of Great Britain, residing at 32 The Avenue, Brondesbury Park, London, England, have invented a certain new and useful Means for Positively Indicating the Condition of Steel During Heat Treatment, of which the following is a specification.

My present invention refers to the heat treatment of steel and relates to a method of and means for positively ascertaining and indicating when the temperature of decalescence or the " change point " or point of "critical temperature" of the steel,—or any pre-arranged weight of it—is attained in a heating chamber or furnace.

It has previously been suggested that an indication should be obtained when steel has arrived at the critical temperature of decalescence by means of apparatus depending for its action partly on magnetism and partly on gravity or induced currents of electricity, whereas my present invention utilizes magnetic forces alone, and my method of and means for indicating consists of a permanent magnet, which is so mounted, suspended or floated as to be free to revolve in a horizontal plane, and to take up positions under the influence of three magnetic forces, two of which are invariable and approximately balanced one against the other, and the third force is the variable magnetic field due to the change of state in the steel undergoing heat treatment. If for any reason the earth's magnetic field cannot be utilized as one of the two invariable forces, then the action of the earth's field upon the permanent magnet must be neutralized or overcome by one or more permanent magnets in the well known and obvious ways.

In carrying out my invention, I arrange a coil capable of conducting electricity around the heat chamber in which the steel to be treated is located, so that when a current of electricity is passed through the coil the steel in the heat chamber will become magnetized. I arrange in proximity to the heat chamber an ordinary magnetic compass or suspended or floated or pivoted magnet in such a position that the compass needle or suspended or floated or pivoted magnet (all of which I will hereinafter refer to as the " compass needle ") will be deflected from its normal north and south position by the magnetized steel in the heat chamber and the compass needle will thus swing back into the normal north and south positions under the influence of the earth's magnetic field when the temperature of decalescence or " change point " or " critical temperature " of the steel is attained.

The best position for the compass or indicator is at such a distance from the magnetizing coil that the stray field from the latter is only just sufficient to deflect the compass needle one or two degrees from its normal position to which it will always strive to return under the influence of the earth's field or other superior controlling field, and under these conditions the introduction of a charge of steel into the heat chamber will cause a marked increase in the deflection of the compass needle, and a correspondingly marked movement of the compass needle in the reverse direction when the charge of steel attains the temperature of decalescence or the " change point " or " critical temperature."

The position of the compass or indicator may be varied within wide limits so long as its position is such that a bigger deflection of the needle is obtained—with the magnetizing coil energized—when the heat chamber contains steel than when the heat chamber contains no steel or only a negligible quantity of magnetizable material.

It is obvious that in the case of an electrically heated furnace wound with a resistance wire or wires (especially when operated on continuous current circuits) my invention can be readily applied to existing furnaces of this type as the resistance winding will afford the necessary magnetizing effect; and it will be advantageous to set up the furnace in such a position that the normal north seeking pole of the compass needle will be caused to swing around and point to the south under the superior influence of the magnetized steel in the heat chamber, and to so arrange the direction of the current through the resistance winding. A deflection of the compass needle over nearly 180° is thus obtainable when steel is introduced into the heat chamber, and the same deflection occurs in the reverse direction when the critical temperature is attained.

In carrying out the present invention it will be seen from the foregoing that it is essential first of all to nearly balance by any suitable means the force exerted on the compass needle by the earth's field (which may be utilized as a convenient and practically constant magnetic force) or by a permanent magnet and the force exerted on the compass needle by the stray field of the magnetizing coils. In practice it is advantageous for the latter force to slightly exceed the former force so that the magnetizing coil produces a deflection of from 1° to 5° when current is switched on.

The compass should be located nearer to the magnetizing coil when the latter is excited by means of alternating current than when it is excited by means of continuous current; but even under the most favorable conditions with alternating current it is difficult to adjust and locate the compass so that a deflection of more than 45° is obtained.

The position for the compass in relation to any particular type of furnace can be readily ascertained in each case as such position will vary according to the strength of the magnetizing coil; and the position of the compass and the direction of the magnetizing current may have to be varied or adjusted under certain conditions, e. g. owing to the presence of external magnetic force, and the consideration of whether or not the heat treatment is required to penetrate through the whole mass of the charge or only through the case and not the core.

The movement of the compass needle may be utilized to connect or disconnect contacts in an electric circuit for the purpose of actuating any signal or other device such as a bell or a tilting device for the purpose of ejecting the charge or in the case of an electrically heated furnace a device for switching off the power and contacts can also be arranged to be made and (or) broken, by the movement of the compass needle, in such a way that the supply of power can be reinstated when the temperature of recalescence is reached.

By another part of my invention suitable electrically operated means may be introduced to control the supply of gas or other fuel so that the temperature of the heat chamber may be controlled by the movement of the compass needle between the temperatures of decalescence and recalescence of the charges.

When an alternating current is used for energizing the magnetizing coil it is sometimes an advantage to employ an intermittent current, and therefore a suitable make and break device, automatic or otherwise, may be included in the circuit, so as to suitably make and break the circuit through the magnetizing coil. With this last arrangement the compass needle will vibrate or swing—and continue to reciprocate—until the decalescence temperature is attained whereupon the compass needle will come to rest and take up a stationary position in its normal north and south direction.

Furthermore in the case of alternating current alone being available it is obvious that this may be rectified by means of any suitable rectifier or any of the well known electrolytic valves. For example the magnetizing coil may be divided into two preferably equal sections and these two sections may be connected in shunt or parallel with one another with an electrolytic valve in each shunt circuit and oppositely connected therein. In this way a substantially unidirectional current may be produced through the two sections of the coil with the desired magnetizing effect or as above stated any other well known suitable rectifying arrangement or apparatus may be employed with the same object.

Referring to the accompanying drawings:—

Figure 1 is a side view in elevation of an electrically heated furnace—part of the side being broken away to show the spirally wound resistance wire or coil by which the furnace chamber is heated—having a magnetic compass (of the ordinary kind) so arranged and mounted on the top of the casing of said furnace as to be capable of being adjusted vertically and horizontally with respect to said casing, according to this invention.

A is a hollow cylinder or tube of quartz or other suitable heat resisting material forming the heat chamber which is provided with a coil B capable of conducting electricity around said heat chamber which latter is mounted in the casing C (with the ends of the tube protruding as shown, or otherwise as desired) and the interior of the casing may be filled or provided with any suitable material D (of a non-conductive character) for packing or insulating the heat chamber inside said casing.

The heat chamber A may be electrically heated in any other desired manner.

E is the magnetic compass which is provided with lugs or bosses F F each having a vertical hole through same to fit and slide vertically on the two rigid upright rods or guides G and on which the same can be rigidly fixed by the pinching screw H at any desired position.

These two vertical guide posts G are fixedly attached to the movable platform or slide plate I which is mounted and held in the horizontal guide rails J fixed to the top of the casing C; these guide rails J forming a horizontal guideway along which the slide I (carrying the upright rods G and compass E thereon) can be moved so as to place the compass in the desired position.

It will thus be seen that the compass E can be readily moved to and fixed in any desired position both (*a*) vertically on the guides G and (*b*) along the horizontal guideway J relatively to the center of the heat chamber A in the casing C.

Figure 1:
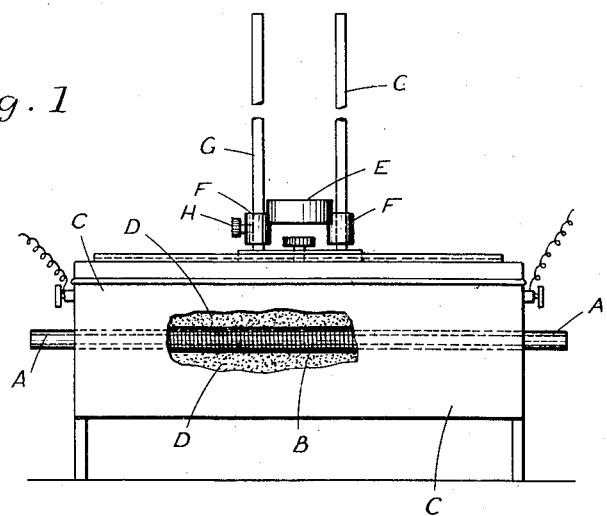
Figure 2:
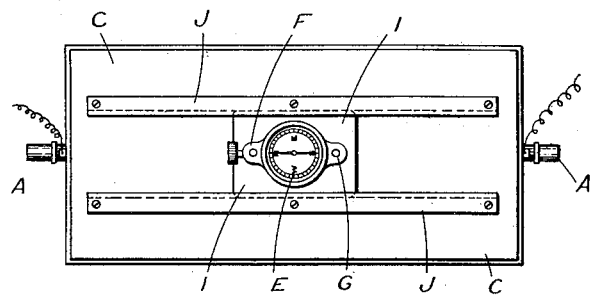
Fig. 2 is a plan view of Fig. 1.
Figure 3:
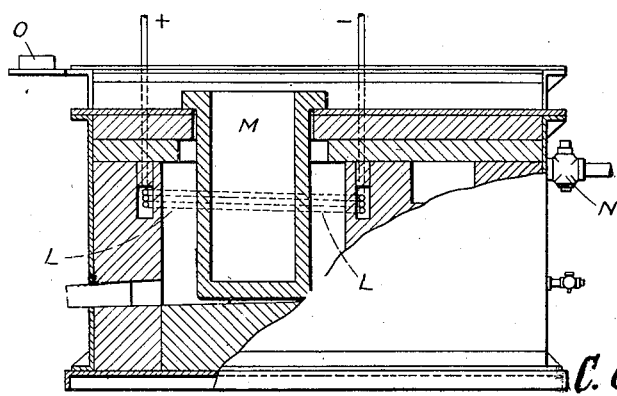
Fig. 3 is a vertical sectional view of an ordinary type of gas-heated furnace fitted with a magnetizing coil and a magnetic compass according to this invention.

In the gas-fired furnace arrangement shown in Fig. 3:—A magnetic coil L is provided—embedded in the casing—around the heat chamber M which latter is heated in the known manner by gas flame; the gas being delivered through the gas valve N.

O is the magnetic compass which in the drawing (Fig. 3) is shown in a fixed position—but it may be mounted in any suitable manner adapted to enable it to be adjusted relatively to the heat chamber M.

It will be obvious that my invention may be similarly employed in the heat treatment of any other magnetizable metal or alloy or mixtures of metals (besides steel) to which the same may be applicable.

What I claim is:—

1. In apparatus for indicating the critical point of heated magnetic substances, the combination with a chamber for receiving magnetic material to be treated, a compass, and means for normally neutralizing the earth's magnetic effect on the compass, whereby magnetic material in the chamber is adapted to influence said compass until heated to the critical point and said compass is adapted to return to neutral position.

2. In apparatus for indicating the critical point of heated magnetic substances, the combination with a chamber for receiving magnetic material to be heated, a compass, and a coil arranged about the chamber and adapted to receive current sufficient for normally neutralizing the earth's magnetic effect on the compass, whereby magnetic material in the chamber is adapted to influence said compass until heated to the critical point and said compass is adapted to return to neutral position.

3. In apparatus for indicating the critical point of heated magnetic substances, the combination of a chamber for receiving magnetic material to be heated, a compass, means for normally neutralizing the earth's magnetic effect on the compass, and adjustable supporting means for the compass, whereby said compass may be adjusted with respect to the neutralizing means and the chamber for regulating the deflection of the compass under influence of magnetic material placed in the chamber and under operation of said neutralizing means.

C. ORME BASTIAN.